May 28, 1963 N. C. COPELAND ETAL 3,091,208
PONTOON-CARRYING CAMPER
Filed April 12, 1961 2 Sheets-Sheet 1
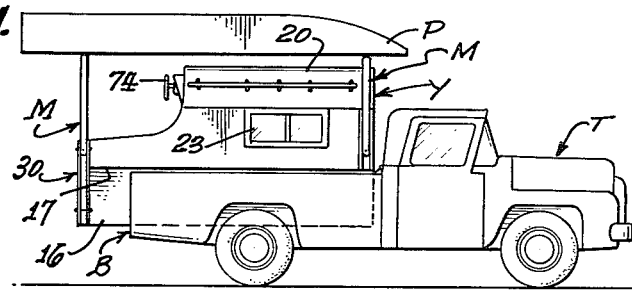
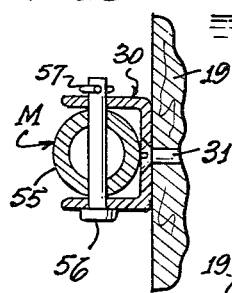
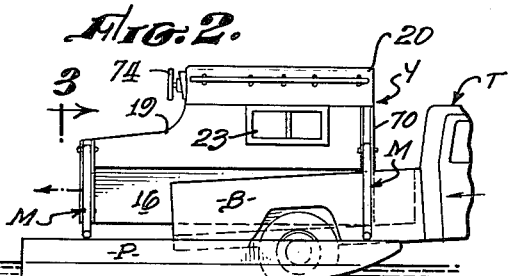
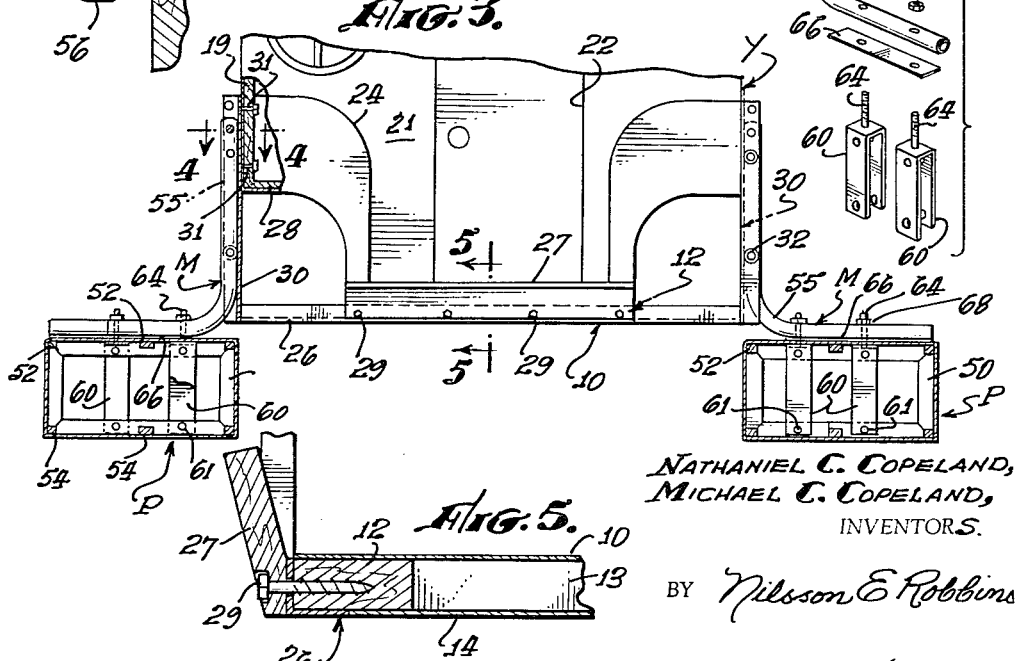
NATHANIEL C. COPELAND,
MICHAEL C. COPELAND,
INVENTORS.
BY Nilsson E. Robbins
ATTORNEYS.

May 28, 1963 N. C. COPELAND ETAL 3,091,208
PONTOON-CARRYING CAMPER
Filed April 12, 1961 2 Sheets-Sheet 2
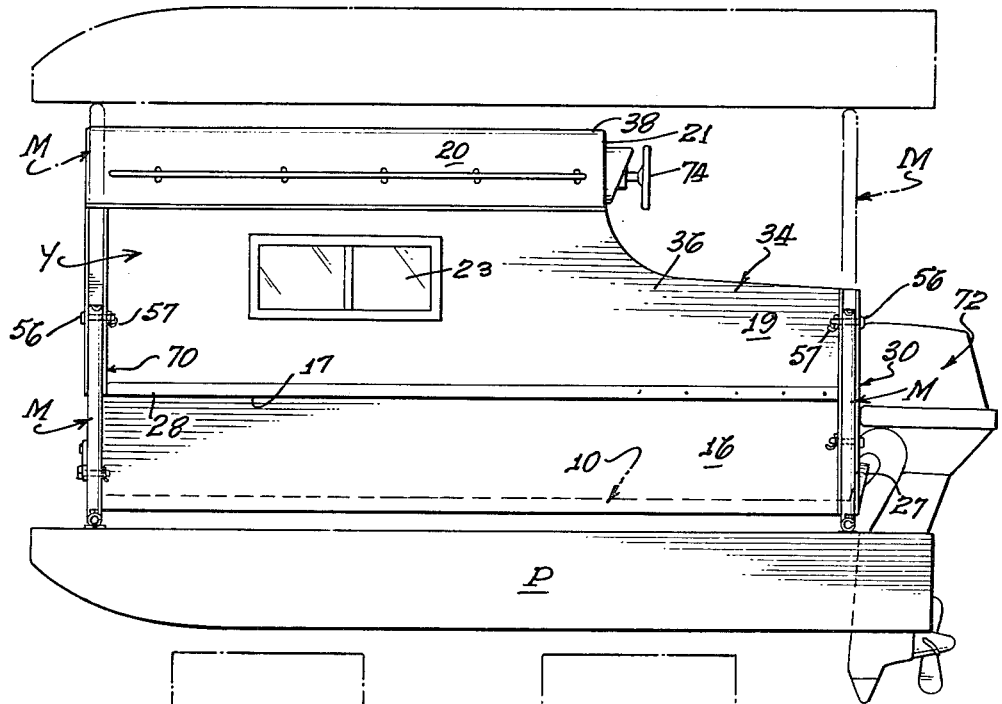
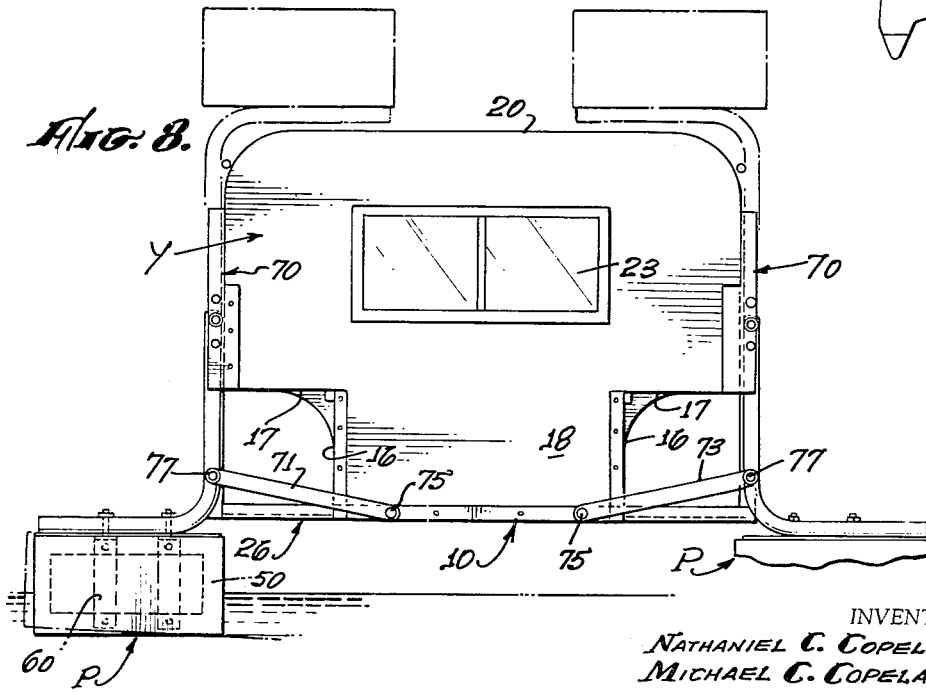
INVENTORS.
NATHANIEL C. COPELAND,
MICHAEL C. COPELAND,
By Nilsson & Robbins
ATTORNEYS.

3,091,208
PONTOON-CARRYING CAMPER
Nathaniel C. Copeland and Michael C. Copeland, North Hollywood, Calif., assignors to Copeland Engineering Enterprises Limited, North Hollywood, Calif., a corporation of California
Filed Apr. 12, 1961, Ser. No. 102,427
18 Claims. (Cl. 115—1)

The present invention relates to a transportation appliance, and particularly to a camper unit formed to mate with the bed of a vehicle for overland transportation, and floatable on and off the vehicle for water transportation.

The desire for compact, readily-portable living quarters has popularized house trailers and other forms of camping units. However, the difficulties of towing and handling house trailers under conditions of heavy traffic and rugged roads have resulted in the development of a camper unit designed to be carried on a light truck, so that the unit may be taken over virtually any passable road to provide compact, comfortable living quarters at a temporary location.

In using house trailers or truck-mounted camper units, temporary quarters are often provided at or near a lake, river or other navigable waters. In such instances, it is generally desirable to have a boat available for use on the water. Therefore, a boat is often transported by towing on a specially-constructed trailer to the site where the camping unit is to be employed, resulting in some inconvenience and expense.

In attempting to simplify the problem of providing living quarters and a boat at a temporary location, various portable amphibious units have been conceived and developed. Specifically, various forms of trailers have been designed which serve as a house trailer while on hand and as a house boat for use on water. In general, however, these units have been subject to various difficulties and have not come into widespread use. Specifically, these amphibious units being trailers have been difficult to move under conditions of heavy traffic or rugged terrain. The units have also been quite expensive, often costing more than both a boat and a house trailer. Furthermore, combination trailer-boats are normally very slow in the water because of the drag incurred by the wheels. Alternatively, if the wheels withdraw into the boat to reduce drag, the costs increase considerably. Additionally, units of this general type are normally usable only on very calm water. Therefore, a need exists for a compact, economical transportation appliance which may be conveniently and easily transported to various sites to provide temporary living quarters, and which may be conveniently and safely employed as a rugged, fast boat for transportation on water.

In general, the present invention comprises a transportation appliance structurally formed to be transported upon a wheeled vehicle and floated therefrom for use on water. The unit is floated from the vehicle by elongate hulls affixed to the unit by pivotally-mounted booms which enable the movement of the hulls from a floating position at the bottom of the unit to a storage position about the unit. The unit may include a structural support beam serving to rigidify the rear end thereof sufficiently to receive an outboard motor so that stresses imparted to the vehicle from the outboard motor are absorbed and transferred to the hulls without the wracking action present if transferred to the hulls through the body. Furthermore, the structure of the invention may incorporate a design resulting in some aerodynamic lift which provides greater speed on water.

An object of the present invention is to provide an improved transportation appliance which may be used on land and water.

Another object of the present invention is to provide a transportation appliance constructed to mate with the bed of a land vehicle, which may be simply and easily floated to and from the vehicle for use on water by lowering booms to which are attached hulls to clear wheels and provide buoyancy almost at ground level. These booms then permit floatation with only a few inches of wheel immersion as contrasted to damaging immersions of vehicle without booms.

Still another object of the present invention is to provide a compact convenient amphibious transportation unit which may be safely and conveniently used on land or water.

A further object of the present invention is to provide an inexpensive structurally-safe camping unit which may be easily used to provide compact living quarters on land or water.

Still a further object of the present invention is to provide a readily-portable boat which may be driven at relatively-high speeds and employed as a towing craft as well as a load-bearing craft.

Another object of the present invention is to provide a transportation appliance, constructed to mate with the bed of a land vehicle, equipped with folding booms of such design as to permit simply and easily separating the appliance from the vehicle, with minimum immersion of parts of the vehicle in the water.

A further object of the present invention is to provide a readily-portable boat equipped with booms of such design as to provide for absorbtion of the stresses caused by the pounding of the catamaran hulls in rough water, thereby resulting in a smooth riding craft when driven at relatively-high speeds.

These and other objects will become apparent from a consideration of the following detailed description taken in conjunction with the drawings, wherein:

FIG. 1 is a side elevational view of a transportation appliance constructed in accordance with the present invention mounted upon a vehicle for overland transportation;

FIG. 2 is a view similar to FIG. 1, illustrating the launching of an apparatus constructed in accordance with the present invention;

FIG. 3 is a sectional view along line 3—3 of FIG. 2;

FIG. 4 is a sectional view along line 4—4 of FIG. 3;

FIG. 5 is a sectional view along line 5—5 of FIG. 3;

FIG. 6 is an exploded view of a portion of the structure shown in FIG. 3;

FIG. 7 is a side elevational view of the apparatus of FIG. 1 fitted for use in the water and including a showing in phantom of the pontoons in the storage position; and FIG. 8 is a front elevational view of the apparatus of FIG. 7.

Referring initially to FIG. 1, there is shown a truck T having a bed B with which the central body Y of a unit constructed in accordance with the present invention is mated. A pair of catamaran-type hulls, or pontoons P are affixed to the sides of the body Y by pivotally mounted booms M. During overland travel, the booms M are swung upwardly to position the hulls P above the central body Y in a convenient storage location which serves to shelter the body.

In using the apparatus on water, the booms M are swung to a downward position as shown in FIG. 2, to locate the hulls P below the bottom of the central body Y. With the hulls in this position, the truck T may be simply backed into shallow water to float the apparatus from the truck bed B in an extremely easy and fast launching operation. When the apparatus is launched, an outboard motor may be employed to drive it at relatively high speed with relative safety from swamping or structural failure.

Considering the apparatus of the present invention in greater detail, the central body Y is formed upon a floor support or platform 10 (FIGS. 4 and 5). The platform 10 comprises a lattice of transverse struts 12 mounted between parallel longitudinal stringers 13 at the sides of the platform. This structure is covered with marine plywood sheets 14 so that the platform is buoyant. Although this buoyancy is not effective during normal use of the unit, it is important in the event of an emergency.

A pair of side panels 16 (FIG. 1) are affixed to the platform 10 to extend upwardly and receive a cabin top which is of greater width than the platform 10 so as to provide a bottom section of the unit which mates with the truck bed B. The side walls 16 extend the full length of the platform 10 may be formed of marine plywood. At the forward end of the central body Y the side panels 16 intersect a front panel 18 (FIG. 8) formed of marine plywood and coinciding in width to the platform 10 up to the height of the side panels 16. Above the side panels 16 the front panel widens to provide the front closure for the cabin.

Lap boards 17 extend outward from the upper edges of the side panels 16 to receive the cabin side walls 19 which in turn carry the cabin top 20. The cabin side walls 19 taper from the rear of the cabin to provide side boards for the cockpit behind the cabin. The rear of the cabin is closed by a bulkhead 21, containing a passageway 22. Windows 23 are provided in the front panel 18 and the cabin side walls 19.

Of course, various engagements in the cabin may be provided and the particular arrangement will depend upon the purposes for which the unit is employed; however, it is to be noted that the lap boards 17 inside the cabin are well suited for use as bunks or seats. Outside the cabin these boards serve as seats in the cockpit.

The rear end of the cockpit is partially closed by a pair of arcuate rear panels 24 and 25 extending from the platform 10 to the rear edges of the lap boards 17 and the side walls 19. At the base of these panels, the platform 10 (FIG. 3) receives a transverse beam 26 formed of angle iron and extending on both sides of the platform 10 to the full width of the unit. The beam 26 serves to transfer forces imparted to the central body by the motor directly to the hulls P. A transom board 27 is affixed to the beam 26 (FIG. 5) by screws 29 extending through these members into the platform 10. The transom board 27 extends substantially the full width of the platform and may be formed of wood. The transom board serves to support an outboard motor and provides additional support for the transverse beam 26, the ends of which are affixed to vertical brackets 30 and 32 extending upwardly to connect to the side walls, as by fasteners 31 (FIG. 3). The brackets 30 are formed of channel stock and serve to support the booms carrying the hulls P, and also serve to lock the booms in a vertical position.

The hulls P of the apparatus comprise a series of vertical transverse cross-sectional frames 50 (FIG. 3) held spaced-apart by top and bottom stringers 52 and 54, respectively. This frame structure may be formed of wood and fastened together with marine and aircraft techniques. At the forward end of the hulls, the bottom stringers 54 curve upward to the top stringers 52. The hulls are covered, for example, with marine plywood and sealed to provide completely buoyant members.

The primary support for the hulls P is provided by the rear booms as illustrated by the exploded view of FIG. 6. The tubular boom member 55 is formed in an L-shaped configuration, with the upper section of the vertical leg pivotally affixed in the channel bracket 30 by a cross bolt 56 (FIG. 4). The boom members 55 are locked in either an upward or downward position by lock pins 57 which extend through the channel bracket 32 for example and the boom members.

The lower leg of the boom member 55 is affixed to one of the frames 50 inside the hull P by U-shaped straps 60 which receive fasteners 61 that pass into the frame. The leg extends to the edge of the hull and provides a socket to receive a bumper, jack bar or other device. The upper flat portion of the straps 60 support bolts 64 which extend through the upper surface of the hull, and a flush plate 66 to pass through the lower leg of the boom member 55 and receive nuts 68.

The forward boom structures are similar to the rear structures described above; however, in these structures, the L-shaped members 68 are affixed in channel brackets 70 (FIG. 7) which are fastened to the side walls 19, and which terminate at the lap board 17. The manner in which the forward boom members 68 are affixed to the hulls is similar to that described with respect to the rear boom members.

The front booms are further restrained in extensive movement by locking bars 71 and 73 (FIG. 8) which are pivotally affixed to the front of the platform by lag screws 75 and bolted (during water use) to the boom members by bolts 77.

Considering the operation of the apparatus disclosed herein to illustrate the present invention, the entire unit is loaded upon a truck T as shown in FIG. 1 and held therein by clamps or turn buckles (not shown). In this location, the booms extend upwardly to support the hulls P over the camper unit; however, it is to be noted that the pontoons do not rest on the cabin top, thereby reducing the likelihood of these structures damaging each other. The unit is solidly affixed to the truck T as a result of mating with the bed B of the truck. Therefore, the composite unit including the truck and the transportation appliance may be relatively-conveniently driven over virtually any passable road as well as highways bearing exceedingly heavy traffic. Furthermore, the unit may be employed as living quarters while on the truck T, in which case, the pontoons P located over the cockpit of the unit provide shade and shelter to a limit extent. Of course, if desired, various awning structures can be conveniently affixed between the pontoons to completely shelter the cockpit space.

Preparatory to using the appliance as a boat, the booms M are released and pivotally swung to a downwardly-extending position where they are locked to support the hulls P below the bed B of the truck T. With the hulls in this position, the truck is backed into shallow water, as shown in FIG. 2, to float the unit from the truck bed B. Of course, when the unit is waterborne, it may be easily separated from the bed of the truck. Next, an outboard motor 72 may be affixed to the transom 22, as shown in FIG. 7 and rigged to the steering wheel 74 for manipulation. Thereupon, the unit is prepared for operation as a safe boat, capable of relatively high speed. Of course, the speed at which the unit is driven depends largely upon the size of the motor 72; however, a successful embodiment of the present invention has been satisfactorily driven at speeds approaching 40 miles per hour by a large 75 horsepower motor.

In the operation of the unit as a boat, even at low speeds it planes to some extent assuming a slight angle of attack. In such a position, air is drawn under the platform 10 resulting in some lift. As the speed is increased, the tendency of the pontoons to plane is increased causing the unit to plane further out of the water and enable greater speeds.

Another important aspect of the present invention resides in the design configuration of the booms so that the boom members 55 act as flexible shock absorbers for forces imparted to the pontoons P. As a result of the length of these members which lies in the channel bracket 30 and is outwardly flexible, efficient shock absorbtion is accomplished.

Another important aspect of the present invention resides in the boom structures which flexibly support the central body Y upon the hulls P. At high speeds, considerable flexure takes place between the pontoons and the body; however, these booms act as resilient springs to absorb a considerable portion of the shock imparted to the unit.

Another important feature of the present invention which results in considerable safety resides in the beam 20 affixed at the rear of the unit and serving to transfer shock forces received by the motor through the base of the flexible booms to the hulls P.

Still another important feature of the present invention resides in the manner in which the booms are attached between the pontoons P and the camper body Y whereby to provide a vertical section for spring purposes while rigidly affixing the boom members to the pontoons P.

It should be noted that although the particular embodiments of the invention herein described are fully capable of providing the advantages and achieving the objects as set forth, such embodiments are merely illustrative and this invention is not limited to the details of construction illustrated and described herein, except as defined by the appended claims.

What is claimed is:

1. A transportation appliance adapted to be transported on a vehicle with overland running gear, and floated therefrom for water transportation, comprising: a substantially-rectangular load-carrying platform including upwardly-extending sides; a pair of elongate hulls; and a pair of boom means affixed to said hulls individually, and pivotally attached to opposite sides of said platform, whereby to position said elongate hulls below said platform and above the bottom of said overland running gear to support said platform above water and positioned above said platform when on said wheeled vehicle.

2. A transportation appliance adapted to be transported on a vehicle with overland running gear, and floated therefrom for water transportation under power from an outboard motor, comprising: a substantially-rectangular platform including upwardly-extending sides; a load beam extending across the rear of said platform and affixed thereto, said beam for carrying the load of said outboard motor; a pair of elongate hulls, and a pair of boom means affixed to said hulls individually, and pivotally attached to opposite sides of said platform, whereby to position said hulls below said platform and above the bottom of said overland running gear to support said platform above water and positioned above said platform when on said wheeled vehicle.

3. Apparatus according to claim 2 wherein said platform comprises a hollow buoyant structure.

4. Apparatus according to claim 2 wherein said boom means each comprise a pair of booms integrally affixed into said pontoons and pivotally attached adjacent the ends of said platform.

5. Apparatus according to claim 2 wherein said pontoons are positioned sufficiently below said platform to provide an airflow under said appliance when powered by said outboard motor.

6. Apparatus according to claim 2 wherein said rear booms are fixed in channel which receives thrust of motor by cross bar fixed to extremity and extending across platform.

7. Apparatus according to claim 2 wherein said front booms are restrained from outward movement by being bolted to safety bars attached to platform.

8. A transportation appliance adapted to be transported on a vehicle with overland running gear, and floated therefrom for water transportation, comprising: a substantially-rectangular platform including upwardly-extending sides; a substantially-rectangular cabin top of greater width and less length than said platform affixed on the forward portion of said platform; a pair of elongate hulls; and a pair of boom means affixed to said hulls individually, and pivotally attached to opposite sides of said platform, whereby to position said hulls below said platform and above the bottom of said gear to support said platform above water and to a position above said platform when on said wheeled vehicle.

9. A transportation appliance adapted to be transported on a vehicle with overland running gear, and floated therefrom for water transportation under power from an outboard motor, comprising: a substantially-rectangular platform including upwardly-extending sides; a substantially-rectangular cabin top of greater width and less length than said platform affixed on the forward portion of said platform; a load beam extending across the rear of said platform to the width of said cabin top and affixed to said platform and said cabin top, said beam for supporting the load of said outboard motor; a pair of elongate hulls; and a pair of boom means affixed to said hulls individually, and pivotally attached to opposite sides of said platform, whereby to position said hulls below said platform and above the bottom of said running gear to support said platform above water and positioned above said platform when on said wheeled vehicle.

10. Apparatus according to claim 9 wherein said hulls are mounted external of said cabin top.

11. Apparatus according to claim 9 wherein airflow spaces are provided between said platform and said hulls.

12. Apparatus according to claim 9 wherein said platform and said cabin top are formed to mate with the bed of said vehicle.

13. A transportation appliance adapted to be transported on a vehicle with overland running gear and containing a partially-closed bed, and floated therefrom for water transportation, comprising: a base section formed to mate with said partially-closed bed; a cabin section affixed on said base section, and extending outwardly therefrom; a pair of elongate hulls; and a pair of boom means affixed to said hulls individually and pivotally attached to opposite sides of said cabin section whereby said elongate hulls may be positioned below said base section and above said overland running gear to support said platform above water and positioned above said cabin when on said wheeled vehicle.

14. Apparatus according to claim 13 wherein said base section is sufficiently above said hulls in the lowered position to provide an air passage from under said base over said pontoons.

15. Apparatus according to claim 13 wherein said boom means include an elongate support member having one end affixed to said cabin section and including a free section extending adjacent said cabin; and a channel means housing said free section.

16. Apparatus according to claim 13 wherein said cabin means section is less than all of said base section.

17. An apparatus for use with a vehicle having an overland running gear to transport said apparatus over land on said vehicle and including means whereby said apparatus may be hydraulically lifted said vehicle by flotation imparted thereto as a result of driving said wheeled vehicle into water, comprising: a base section formed to mate with said partially-closed bed; a cabin section affixed on said base section, and extending outwardly therefrom; a pair of elongate hulls; and a pair of boom means affixed to said hulls individually and pivotally attached to opposite sides of said cabin section whereby said hulls may be positioned below said base section and above said running gear to support said platform above water and otherwise positioned above said cabin when on said wheeled vehicle.

18. Apparatus according to claim 17 wherein said vehicle further includes support means at the front and rear thereof to transfer forces from said hulls to said base section.

References Cited in the file of this patent

UNITED STATES PATENTS

| | | |
|---|---|---|
| 1,683,276 | Woods | Sept. 4, 1928 |
| 2,850,747 | Bouchard | Sept. 9, 1958 |
| 2,994,294 | Roth | Aug. 1, 1961 |
| 2,995,397 | Eames | Aug. 8, 1961 |

FOREIGN PATENTS

| | | |
|---|---|---|
| 501,126 | Italy | Nov. 23, 1954 |